(12) United States Patent
Hewitt et al.

(10) Patent No.: US 6,199,132 B1
(45) Date of Patent: *Mar. 6, 2001

(54) COMMUNICATION LINK WITH ISOCHRONOUS AND ASYNCHRONOUS PRIORITY MODES

(75) Inventors: Larry D. Hewitt; Dale E. Gulick, both of Austin, TX (US)

(73) Assignee: Advanced Micro Devices, Inc., Sunnyvale, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/098,854

(22) Filed: Jun. 17, 1998

(51) Int. Cl.⁷ .................................................. G06F 13/00
(52) U.S. Cl. ........................ 710/107; 710/106; 710/116
(58) Field of Search ................................. 712/1; 710/113, 710/116, 107, 106

(56) References Cited

U.S. PATENT DOCUMENTS

| 5,422,883 | 6/1995 | Hauris et al. ............................ 370/62 |
| 5,450,411 | 9/1995 | Heil ....................................... 370/94.2 |
| 5,621,898 | 4/1997 | Wooten ................................ 395/297 |
| 5,640,392 | 6/1997 | Hayashi ............................... 370/395 |
| 5,742,847 | 4/1998 | Knoll et al. .......................... 395/866 |
| 5,758,075 | * 5/1998 | Graziano et al. .................... 709/250 |
| 5,758,105 | 5/1998 | Kelley et al. ........................ 395/293 |
| 5,761,430 | 6/1998 | Gross et al. .................... 395/200.55 |
| 5,761,448 | 6/1998 | Adamson et al. .................... 395/284 |
| 5,872,998 | 2/1999 | Chee .................................... 395/876 |
| 5,948,080 | 9/1999 | Baker .................................... 710/37 |
| 6,011,784 | * 1/2000 | Brown et al. ........................ 370/329 |

OTHER PUBLICATIONS

Intel Corporation, "Accelerated Graphics Port Interface Specification", Revision 1.0, Jul. 31, 1996, pp. 1–152.
Wickelgren, Ingred J., "The Facts About Fire Wire", IEEE Spectrum, Apr. 1997, pp. 20–25.
Gwennap, Linley, "MediaGX Targets Low–Cost PCs", Microprocessor Report, vol. 11, No. 3, Mar. 10, 1997, pp. 1–6.
Compaq, Digital Equipment Corp., IBM PC Company, Intel, Microsoft, NEC, and Northern Telcom, "Universal Serial Bus Specification", Revision 1.0, Jan. 15, 1996, pp. 3–268, particularly Chapters 4 and 5.

* cited by examiner

Primary Examiner—Meng-Ai T. An
Assistant Examiner—Mackly Monestime
(74) Attorney, Agent, or Firm—Zagorin, O'Brien & Graham LLP

(57) ABSTRACT

A bus transfers information including isochronous and asynchronous data between a first and a second integrated circuit. The bus guarantees a minimum bandwidth to isochronous data and also tries to minimize latency for isochronous data. The bus transfers data in asynchronous priority mode during a first portion of a first time period, wherein asynchronous data is transferred preferentially over isochronous data. Transfers over the bus selectably switch to isochronous priority mode for a second portion of the first time period in order to guarantee transfer of a predetermined amount of isochronous data during the first time period, thus guaranteeing the minimum bandwidth to isochronous data.

38 Claims, 10 Drawing Sheets

COMMUNICATION LINK WITH ISOCHRONOUS AND ASYNCHRONOUS PRIORITY MODES

CROSS REFERENCE TO RELATED APPLICATIONS

This application relates to co-pending application Ser. No. 09/098,876 filed the same day as the present application, entitled WRITE ONLY BUS WITH WHOLE AND HALF BUS MODE OPERATION, by Larry Hewitt; and co-pending application Ser. No. 09/099,227 filed the same day as the present application, entitled METHOD OF MODE CONTROL IN A BUS OPTIMIZED FOR PERSONAL COMPUTER TRAFFIC, by Larry Hewitt, both of which are incorporated herein by reference.

BACKGROUND OF THE INVENTION

1. Field of the Invention

This application relates to data communication via busses and more particularly to optimizing a bus for personal computer data traffic.

2. Description of the Related Art

In current and future personal computer systems, two basic types of data are transferred between integrated circuits: isochronous data and asynchronous data. Isochronous data refers to data used in real-time data streams such as audio data or motion-picture video data. Asynchronous data is used for all other transfers, such as central processing unit (CPU) accesses to peripherals or bulk data transmissions from a hard drive into system memory.

At present, proper support for both kinds of data in computer systems is inadequate. For example, the peripheral component interface (PCI) bus, a major input/output bus in present computer architectures, does not support isochronous data. If a computer system gives asynchronous data priority or treats isochronous data as asynchronous data, then those functions relying on real time data, such as motion-picture video, may not function satisfactorily. Alternatively, if a computer system prioritizes isochronous data, then the performance of the computer system can suffer since the latency of asynchronous data become unacceptably long. As computer systems are called on to perform more and more real time activity, such as real time video, it becomes more critical that asynchronous and isochronous data be treated in a manner that prevents problems from occurring in the real time tasks without adversely effecting other aspects of computer performance. Thus, there exists a need to appropriately accommodate both kinds of data in present and future computer systems.

SUMMARY OF THE INVENTION

Accordingly, the invention provides a method and apparatus which guarantees isochronous data a specified amount of bandwidth and worst-case latency. Further, the bus protocol attempts to reduce latency for transfer of asynchronous data in order to improve system performance. At the beginning of a bus frame, the bus transfers data in asynchronous priority mode by prioritizing transfer of asynchronous data over isochronous data. According to the bus protocol, each bus interface tracks the amount of isochronous data transmitted and the bus switches to isochronous priority mode if necessary to guarantee isochronous bandwidth for the frame. If the bus switches to isochronous priority mode, the bus stays in isochronous priority mode until all isochronous transfers are complete.

In a first embodiment, the invention provides a method of transferring information on a bus between a first and a second integrated circuit, the information includes address information, isochronous data, asynchronous data and control information. The method includes transferring data on the bus in asynchronous priority mode during a first portion of a first time period, wherein asynchronous data is transferred preferentially over isochronous data. Transfers over the bus selectably switch to isochronous priority mode for a second portion of the first time period to guarantee transfer of a predetermined amount of isochronous data during the first time period.

In another embodiment, the invention provides an apparatus including a bus interface coupled to transfer information to and from a bus, the information including address information, isochronous data, asynchronous data and control information. The bus interface includes an arbiter circuit responsive to a priority mode of the bus to selectably transfer either asynchronous or isochronous data over the bus. The arbiter circuit also determines a priority mode of the bus, the priority mode being asynchronous priority mode during a first portion of a first time period on the bus. The arbiter circuit guarantees transfer of a predetermined amount of isochronous data by selectably switching to asynchronous priority mode for a second portion of the first time period.

BRIEF DESCRIPTION OF THE DRAWINGS

The present invention may be better understood, and its numerous objects, features, and advantages made apparent to those skilled in the art by referencing the accompanying drawings, wherein the use of the same reference symbols in different drawings indicates similar or identical items.

DESCRIPTION OF THE PREFERRED EMBODIMENT(S)

Figure 1:
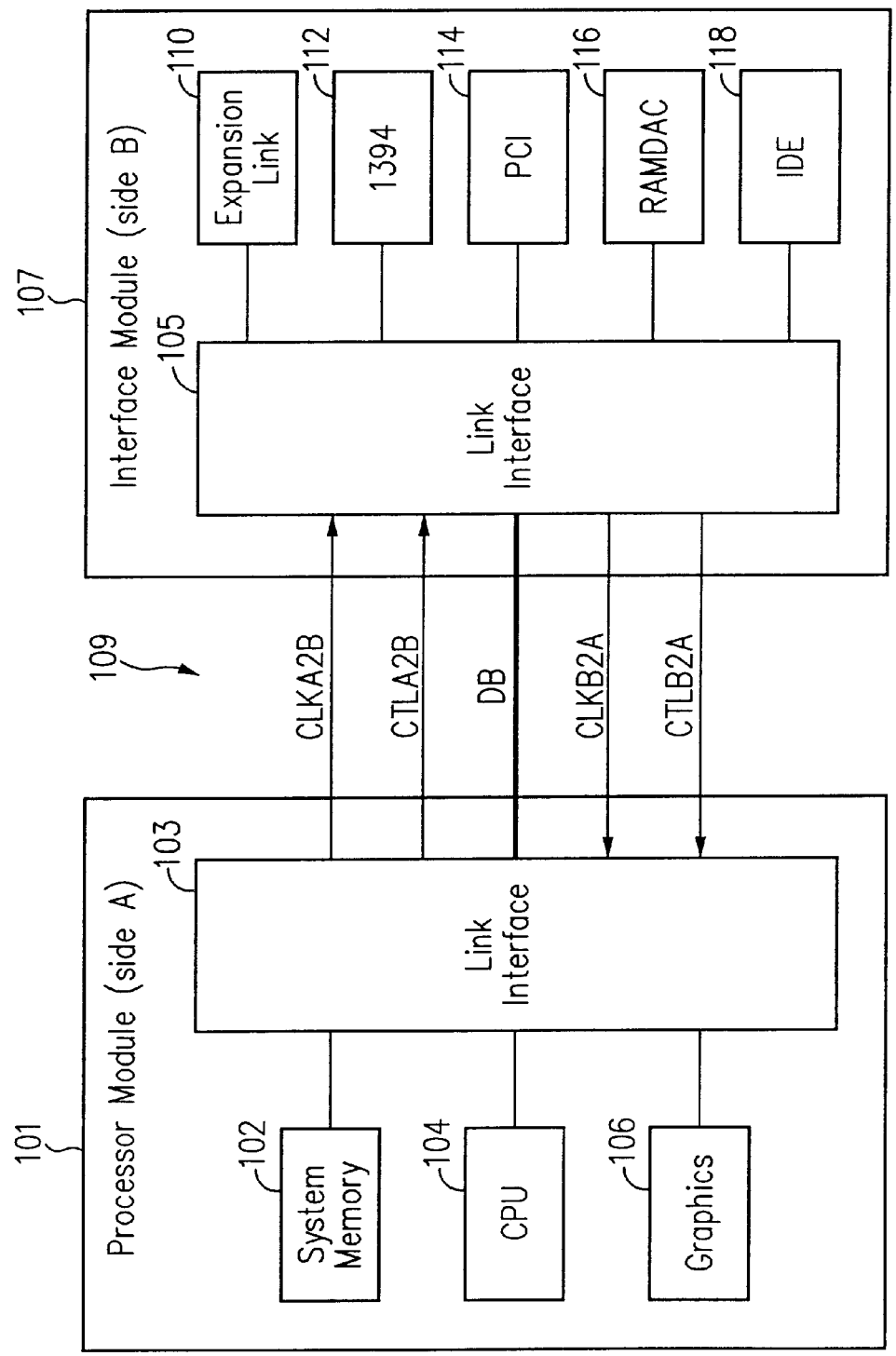
FIG. 1 shows a processor module and an interface module of a personal computer system coupled by a bus according to the present invention.

Referring to FIG. 1, a portion of a typical personal computer system is shown which utilizes a bus according to the present invention, to allow to data to flow between two integrated circuits. The illustrated embodiment described herein is particularly useful for general purpose communication between integrated circuits (IC) in a printed circuit board (PCB) environment. The computer system includes processor module 101 and interface module 107. Processor module 101 includes a link interface 103 which is coupled to link interface 105 in interface module 107 via bus (also referred to herein as link) 109. Bus 109 provides guaranteed bandwidth and latency to each isochronous stream such as RAMDAC data, audio data, and 1394 isochronous streams while also attempting to minimize latency to asynchronous accesses such as CPU-initiated accesses and PCI-initiated accesses.

The exemplary processor module 101 provides the major processing function in the computer system and includes system memory 102, central processing unit (CPU) 104 and graphics controller 106. Interface module 107 provides an interface between various input/output devices such as video monitors, hard drives, scanners, printers, network connections, modems etc., and the processor module. The exemplary I/O module 107 includes expansion link 110 (providing an interface to the industry standard architecture (ISA) bus), IEEE 1394 interface 112, peripheral component interface (PCI) 114, RAMDAC 116 and Intelligent Drive Electronics (IDE) controller 118.

Bus 109 connecting the processor module and the interface module includes data portion DB. Data bus DB includes two bi-directional data portions. In one embodiment, each data portion contains one byte (8 bits) of data. However, the number of bits on the data bus may be of size $(2^n-1:0)$, where n is an integer>0. Thus, a minimum implementation has one data bit in each direction. In the illustrated embodiment, n equals 4, with each data portion having one byte.

The system is divided into two sides with processor module 101 arbitrarily designated side A and interface module 107 designated as side B. Bus 109 also includes a unidirectional clock line CLKB2A and a unidirectional control line CTLB2A provided by link interface 105 to interface module 107. The "B2A" designation indicates that the signal is an output of side B and an input to side A. Bus 109 also includes a second unidirectional clock line CLKA2B and a second unidirectional control line CTLA2B, which are provided by processor module 101 to interface module 107. The "A2B" designation indicates that the signal is an output of side A and an input to side B. The protocol uses clock-forwarding technology to reliably synchronize source data to a clock. CLKA2B and CLKB2A are preferably derived from the same source such that they are the same frequency and they do not drift.

Figure 2:
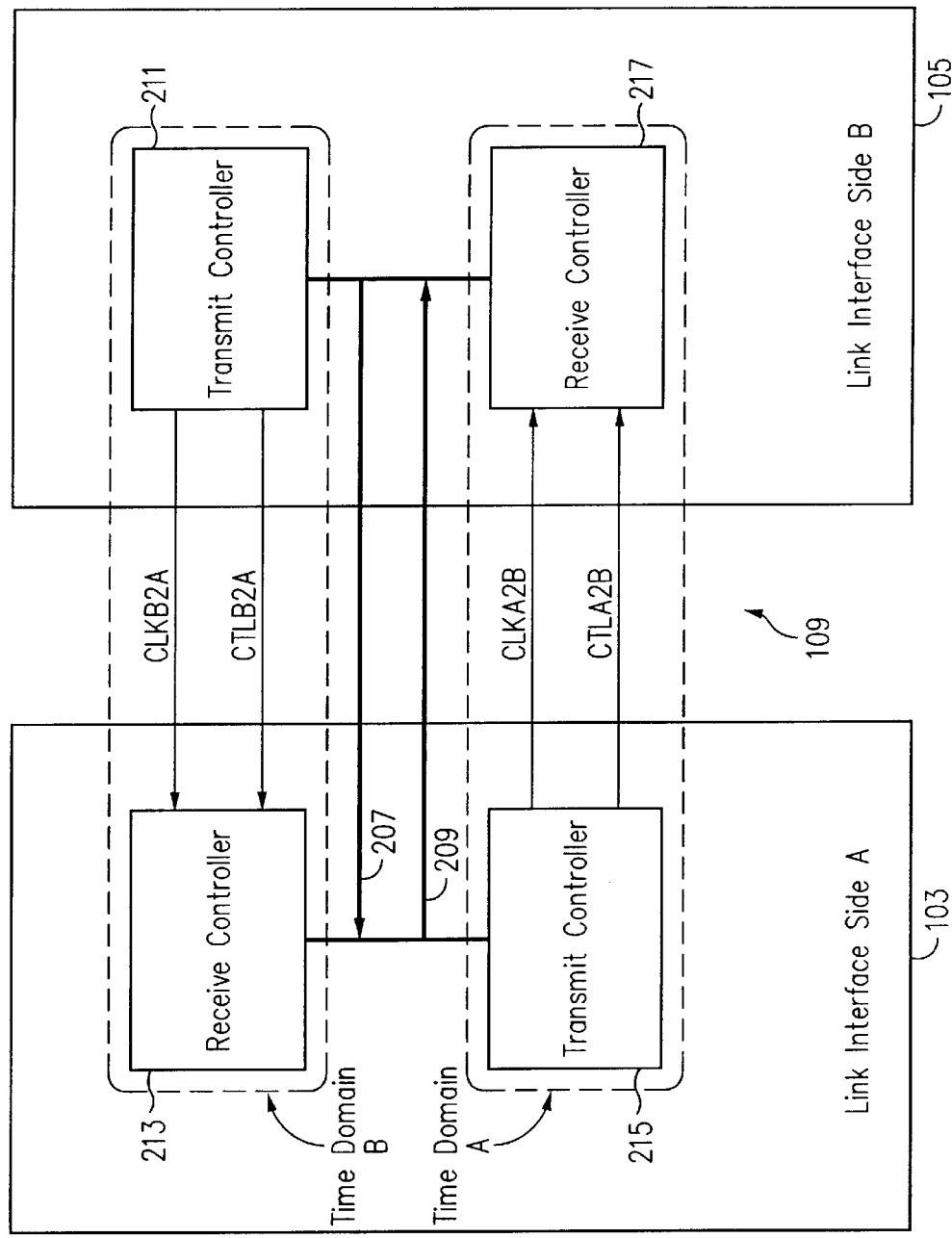
FIG. 2 shows further details of the bus and the bus interfaces.

Referring to FIG. 2, the data bus DB and the link interfaces are shown in greater detail. Each side includes a transmit controller and a receive controller. Data always flows from the transmit controller on one side to the receive controller on the other side. Thus, side A link interface 103 includes transmit controller 215 and a receive controller 213. Side B link interface includes transmit controller 211 and receive controller 217. The two bi-directional portions 207 and 209 of data bus portion DB are shown with arrows indicating their default direction of transfer. Data bus portion 207 transmits data in a default mode of operation, from transmit controller 211 to receive controller 213 (from side B to side A) synchronous with CLKB2A. Data portion 209 of the data bus is dedicated, in a default mode of operation to transmit data from transmit controller 215 to receive controller 217 (side A to side B), synchronously with CLKA2B. In the illustrated embodiment, bus 109 is a point to point bus physically connecting precisely two integrated circuits. In that way, transfer speed across the bus may be maximized. However, some embodiments of the bus may connect more than two integrated circuits to the bus.

The side A transmit controller delivers clock CLKA2B to the side B receive controller, and the side B transmit controller delivers clock CLKB2A to the side A receive controller. Thus, the side A transmit controller and side B receive controller are included in the same time domain, called time domain A, and the side B transmit controller and the side A receive controller are included in the same time domain, called time domain B.

Figure 3:
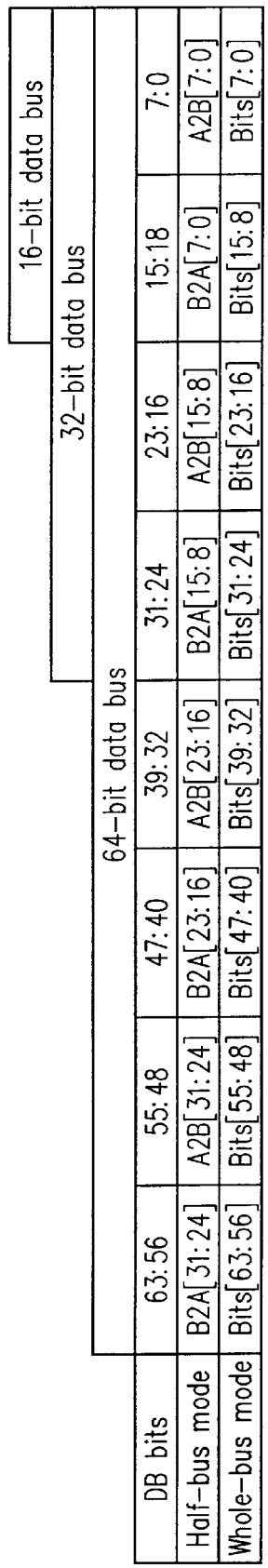
FIG. 3 shows how the bytes of the bus are ordered for various bus widths.

The ordering of bytes over the data bus in the illustrated embodiment is "little endian." That means that the least-significant addresses are sent over the least-significant bytes of the bus. Data is always ordered from lower addresses to higher addresses. The bytes of the bus are ordered by the pattern shown in FIG. 3 for various bus widths.

In order to enhance interoperability, bus implementations may support minimum bus widths as well as their own implementation. In one such an embodiment, for example, if a bus width of $2^4$ is the minimum permitted bus width, busses of width $2^n$ should support connection to widths of $2^4$ though $2^{n-1}$, in addition to $2^n$. Thus, for example, a 64-bit implementation could also connect to either a 16-bit or a 32-bit implementation in addition to another 64 bit implementation.

In the illustrated embodiment, both side A and side B initialize to a mode of 16 bits wide and 800 megahertz data rate. The data rate is based on a clock (CLK) (meaning CLKA2B and CLKB2A) rate of 400 megahertz and the data is provided on each edge of the clock. So, if clock is 400 megahertz, this represents 800 million edges per second. Address phases and data phases of bus cycles transfer information at each edge of CLK. Thus, the edge rate of CLK specifies the maximum theoretical bandwidth of the bus rather than the cycle rate. Preferably, both sides of the link are programmed to support the smaller bit width of the two sides and the lower frequency of the two sides. If both sides of the bus can operate at greater than 800 megahertz, then the bus frequency can be dynamically increased to highest value that meets both sides' requirements.

Two kinds of traffic occur over bus 109: bus cycles and messages. The greatest amount of bandwidth is used by bus cycles, which are transfers of blocks of addressing information or addressing information and associated data sent from one link layer to the link layer on the other side. The addressing information determines where in the integrated circuit a particular access is targeted. A bus cycle may be a long or short bus cycle. A long bus cycle long may utilize several hundred nanoseconds of bus time while a short bus cycle uses less than, e.g., 20 or 30 nanoseconds. The second type of bus traffic is messages, which are used to send protocol information across the link. In the illustrated embodiment, messages are aligned to the rising edge of CLK and consume one CLK cycle and can occur at any time, including in the middle of bus cycles.

Figure 4:
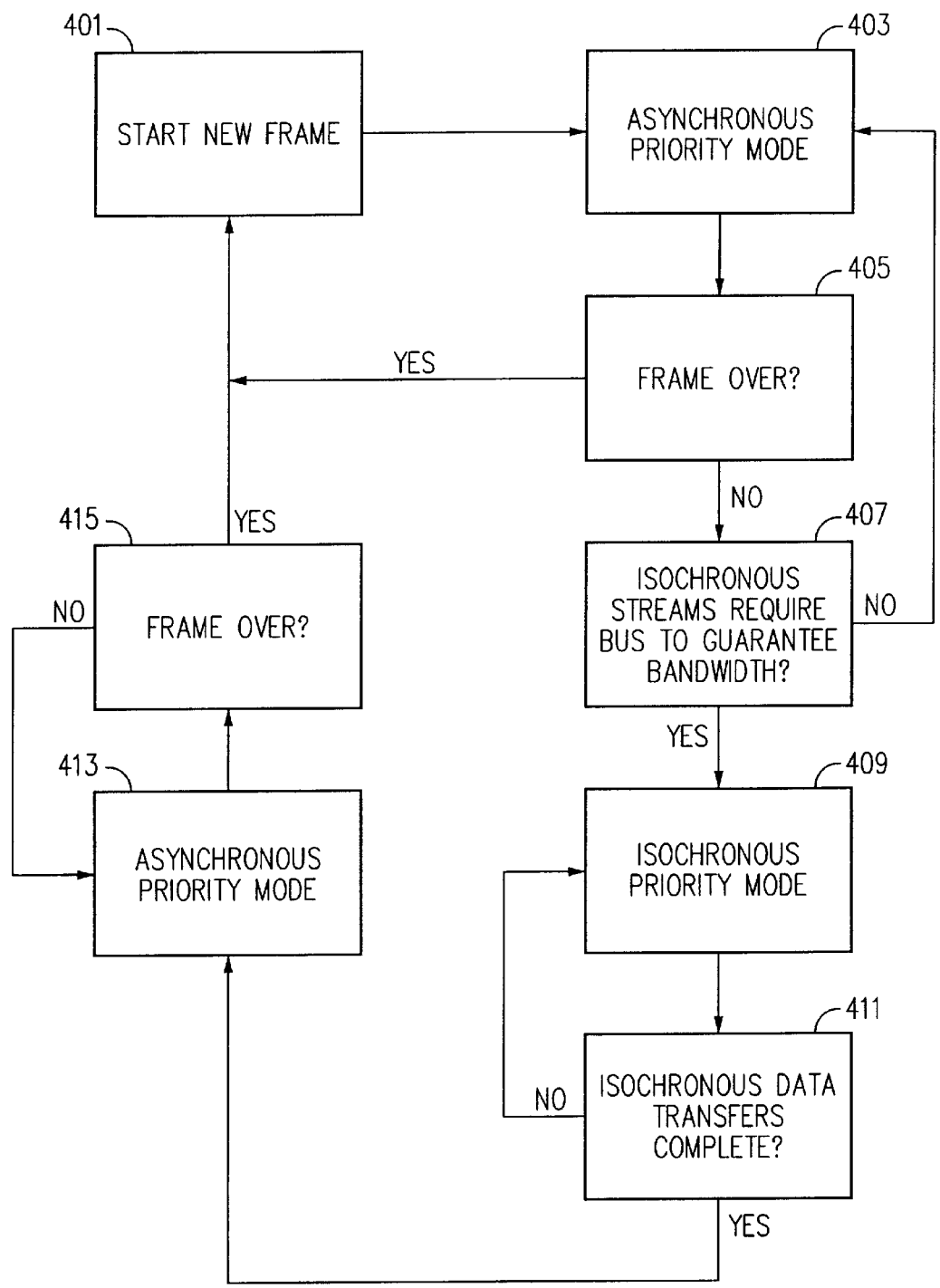
FIG. 4 illustrates a flowchart for determining when to enter isochronous priority mode.

In order to provide the necessary isochronous bandwidth on the bus for isochronous streams, the isochronous streams are guaranteed a specified amount of bandwidth during each frame on the bus. In the illustrated embodiment, frames are 2 microseconds in length. Referring to FIG. 4, a flowchart illustrates one method of guaranteeing sufficient isochronous bandwidth according to the present invention. Initially during the frame, asynchronous transfers are granted priority over isochronous transfers (to minimize the latency of the asynchronous transfers), which is called asynchronous priority mode. Thus, at the start of each new frame 401, the bus enters asynchronous priority mode at 403. In asynchronous priority mode, asynchronous transfers will be transferred instead of isochronous transfers if there are asynchronous requesters for the bus. However, isochronous data may be transferred when the bus is in asynchronous priority mode when there is no asynchronous data to transfer. If the frame is not over at 405, step 407 determines whether it is necessary to start transferring only isochronous data (isochronous priority mode) to guarantee sufficient bandwidth is provided for isochronous data. If so, the bus switches to isochronous priority mode in step 409. The bus stays in isochronous priority mode until all isochronous transfers are complete. There is preferably some cushion factored into the isochronous determination in step 407 so that there is at least some time left in the particular frame after all isochronous data is transferred. After transferring all isochronous data, the bus returns to asynchronous priority mode at 413 until the frame is over at 415. It is possible for the bus to stay in asynchronous priority mode the entire fame without switching to isochronous priority mode as is described further herein.

The bus 109 is most useful in situations where high-bandwidth asynchronous traffic must be mixed with isochronous traffic. The bus protocol assumes (1) that system performance is adversely affected by the latency of asynchronous traffic, (2) asynchronous traffic can be delayed indefinitely without adversely affecting real-time data streams, (3) isochronous traffic must be guaranteed a specified amount of bandwidth and worst-case latency, and (4) as long as the bandwidth and latency requirements for isochronous traffic are met, then the latency between their requests and the transfer of the data has no adverse affect on system performance.

The hardware on each side of the bus includes a physical layer, a protocol layer, and a link layer. The protocol layers for both sides of the bus include the same hardware elements. In this way, the bus is symmetrical with no centralized resources (as opposed to, for example, the PCI bus arbiter which is typically located in the north bridge of the PCI bus and arbitrates for all masters).

Figure 5:
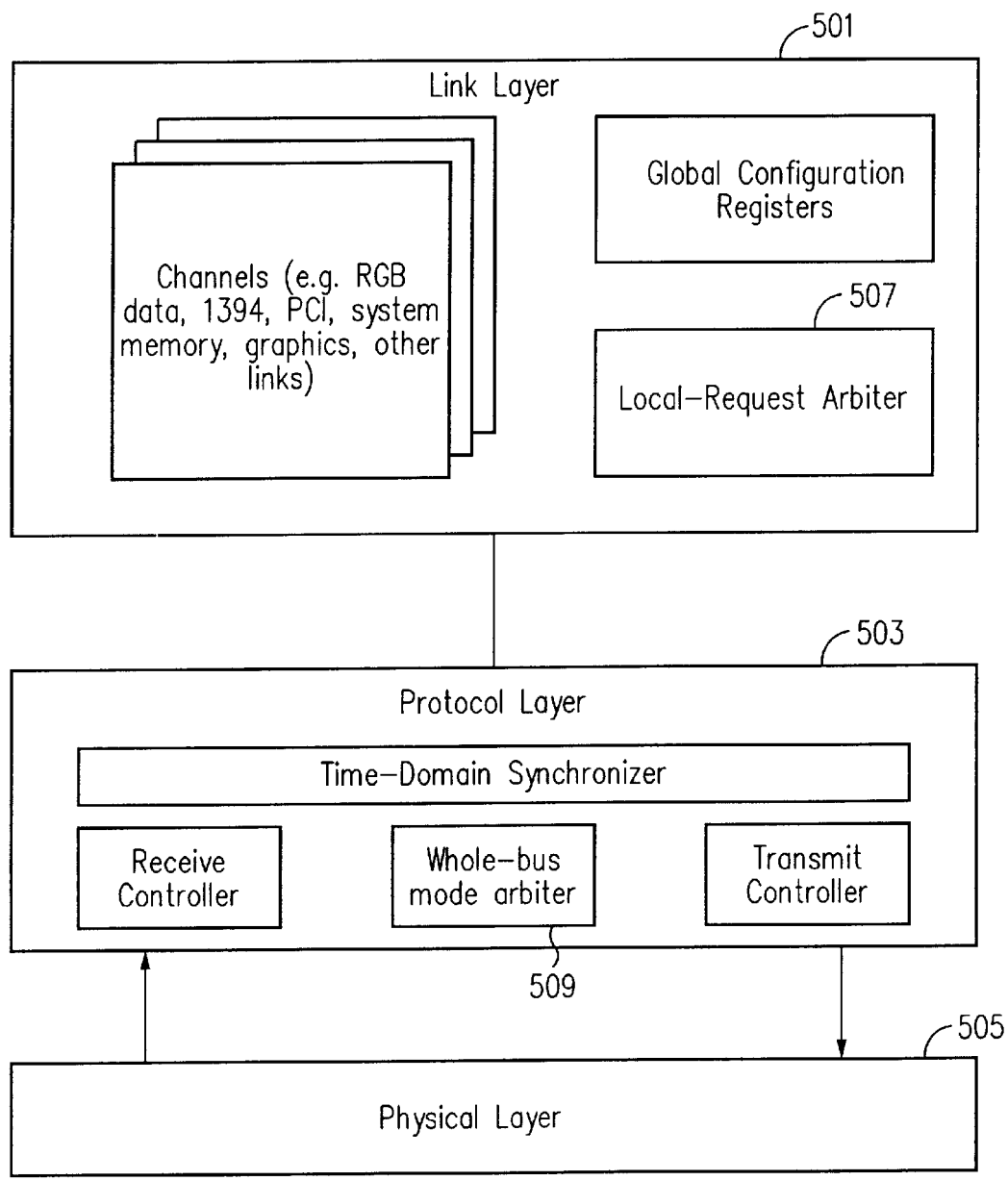
FIG. 5 illustrates the link layer, protocol layer and physical layer of the bus.

Referring to FIG. 5, the bus includes link layer 501, protocol layer 503, and physical layer 505. The physical layer will depend on such factors as the frequency of the bus, the number of devices on the bus, the length of the bus, as is known to those of skill in the art. The specification for the physical layer and the protocol layer is generally device independent, except for variations of the bus width and frequency. The specification for the link layer varies based on the requirements of the device.

There is one channel in the link layer for each functional unit connected to the bus. For example, processor module 101 (FIG. 1) may include three channels: one for the CPU, one for system memory, and one for the graphics controller. The corresponding interface module 107 may include five channels: one for the 1394 interface, one for the RAMDAC, one for the PCI bus, one for an IDE interface, and one for an expansion bus interface. The link layer also includes an arbiter 507 to determine the source of the next locally-generated bus cycle since there are typically multiple asynchronous and isochronous sources. The arbiters guarantee bandwidth to isochronous streams (within a maximum latency) while minimizing latency to asynchronous accesses.

Figure 6:
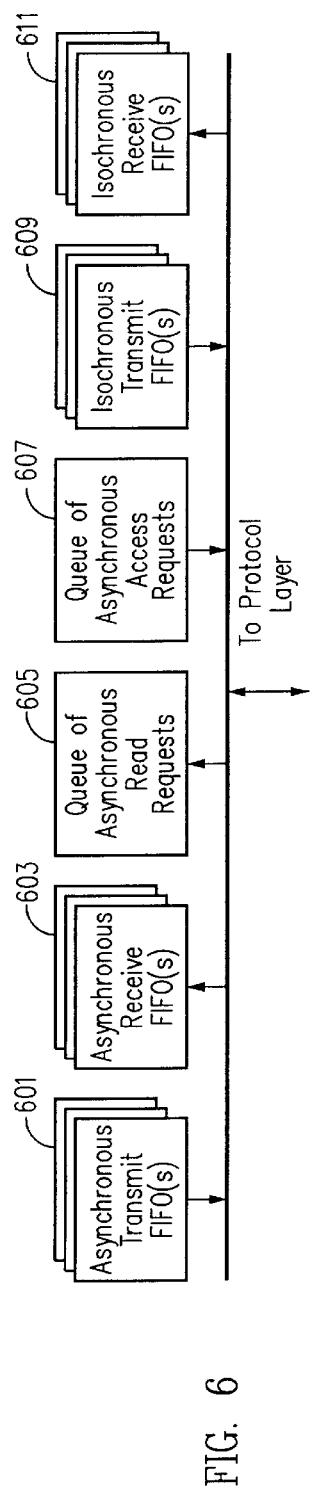
FIG. 6 illustrates one channel of the link layer.

Referring to FIG. 6 a typical channel in the link layer is shown. Each channel in the link layer includes FIFOs and queues of addressing information and data that have been sent across the bus or that will be sent across the bus. Thus, in FIG. 6 asynchronous transmit FIFO(s) 601 store asynchronous data that will be sent across the bus while asynchronous receive FIFO(s) 603 store asynchronous data received from the protocol layer. The channel shown in FIG. 6 also includes queues of asynchronous read requests 605 and access requests 607. Isochronous transmit and receive FIFO(s) 609 and 611 respectively store isochronous information for transmitting and store isochronous information that has been received.

The link layer hardware, unlike the protocol layer, is specific to the requirements of the local integrated circuit on which the link layer is implemented. FIFOs and queues are designed to the specific requirements of the channels being serviced by the link. Generally, the FIFOs of each channel are optional, based on the channel requirements. For example, one would not expect any isochronous transmit or receive FIFOs for the interface module's PCI block, since the PCI protocol does not allow for guaranteed isochronous data transfers (although, nothing prevents a designer from including these for the PCI bus channel). The interface module's RAMDAC interface 116 (FIG. 1), which provides data for the display, would typically require a single isochronous receive FIFO and potentially no asynchronous access FIFOs at all.

FIFOs utilized in the link layer are designed with the following considerations in mind. The FIFO may contain isochronous or asynchronous data; the FIFO may transmit data to the bus or receive data from the bus; the FIFO has a predetermined size (in bytes); the FIFO may be a master (controlled by local timing) or a slave (responding only to accesses); if a FIFO is a slave, then design considerations include what causes the slave FIFO to be loaded. The FIFO target address may be static or it may increment with each byte, in which case it will be reloaded periodically.

The size of the isochronous FIFOs can be determined according to the following equation: (maximum required bandwidth in bytes per second)×(frame time in seconds)×2. For example, to support a 600 megabyte per second RAMDAC data stream, the FIFO would be required to b 2400 bytes deep.

The processor module's system memory channel has special requirements, since multiple streams from the interface module may attempt to access it. It requires several isochronous transmit and receive FIFOs and, potentially, multiple asynchronous FIFOs.

There are special design considerations for the system memory channel because it is required to connect to widely varying interface module channels on the other side of the bus. So the system memory channel may include a 2x bandwidth RAM and an array of programmable head and tail pointers for various FIFOs. A typical implementation may include a 4K byte block of SRAM and 16 head and tail pointer pairs. Software configures these based on the channel requirements on the other side of the link.

As previously mentioned a bus cycle is defined as a block transfer of either addressing information by itself or addressing information followed by data. The address phase of a bus cycle transmits the addressing bytes over the link and the data phase, if there is one, transmits the associated data bytes over the link. The bus is write only in that reads are accomplished by (1) sending a read request from a first side to the second side, after which, (2) the read data is retrieved and, in a separate cycle, sent from the second side to the requesting side. Bus cycles are granted to either asynchronous or isochronous requesters. Requesters are link-layer devices that are currently requesting use of the link for a bus cycle.

The address phase occurs at the beginning of each bus cycle and typically includes the type of bus cycle being transmitted, the number of bytes to be transmitted in the bus cycle, bus-specific cycle type and address and whether both halves of the bus are requested for the transfer. There are several types of cycles in one embodiment as illustrated in Table 1.

TABLE 1

Cycle Types

| Cycle type | Description |
| --- | --- |
| Asynchronous read request | Send request to read data from one side to another |
| Asynchronous read response | Send requested data back across the bus |
| Asynchronous write request | Send address and data from one side to another |
| Asynchronous write response | Acknowledgment back to initiator of write that data has been received |
| Isochronous read request | Send request to read data from one side to another |
| Isochronous read response | Send requested data back across the bus |
| Isochronous write | Send address and data from one side to another |

In a default mode of operation, the data bus of the illustrated embodiment is split in half, with the 8 least significant bits (LSBs) of each 16-bit block controlled by the side A time domain and the 8 most significant bits (MSBs) of each 16-bit block controlled by the side B time domain. However, the bus protocol allows one side to utilize both halves of the bus to transmit data. The "local half-bus" refers to the half of the bus that is defaulted to be owned by the local transmit controller on an integrated circuit (LSBs for side A and MSBs for side B). The "external half-bus" refers to the other half of the bus, the half that is defaulted to be owned by the transmit controller on the other side of the link.

Thus, the protocol layer includes an arbiter (509 in FIG. 5), called the whole-bus mode arbiter, for the local half-bus to determine if it will be used to transmit data (default mode) or if it will be used to receive external data. Half-bus mode refers to the default state of the link, in which side A controls the LSBs and side B controls the MSBs in the illustrated embodiment. Whole-bus mode refers to the state in which both halves of the data bus have been granted to a transmit controller. The whole-bus mode arbiter only determines when to enter whole-bus mode. Arbitration for a locally-initiated bus cycle is handled via the link layer by the local request arbiter.

Short bus cycles (e.g., accesses that consume 30 nanoseconds of bus time or less, while only using half the data bus) are completed solely on the local half-bus. Long accesses (e.g., longer than 30 nanoseconds) may utilize several hundred nanoseconds of bus time, and start by sending data over local half-bus. While data is being transferred, arbitration for the external half-bus occurs (determining if there are local requesters), and then once the external half-bus is granted, the whole bus is utilized for the remainder of the bus cycle's transfers. Short bus cycles are allowed to complete without being halted. Long bus cycles can be halted for higher-priority traffic and then re-started at a later time.

Figure 7:
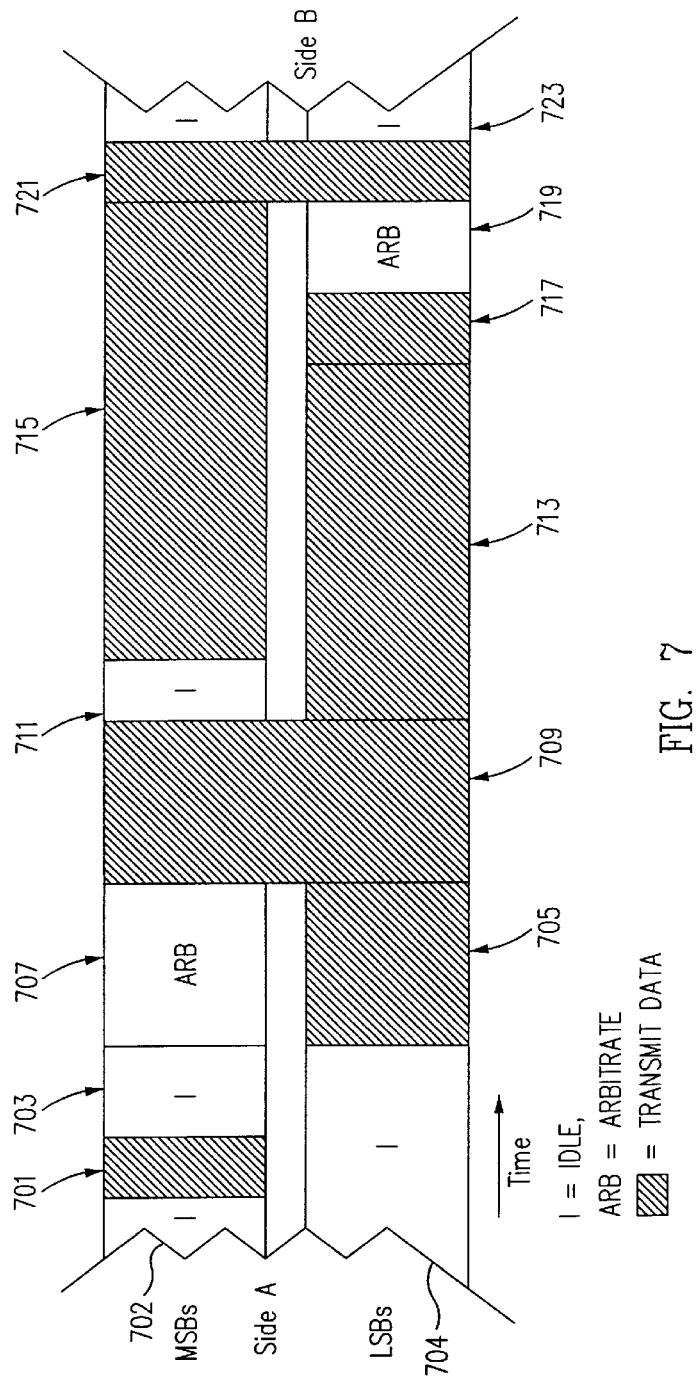
FIG. 7 illustrates the whole and half bus modes on the bus according to one embodiment of the invention.

Referring to FIG. 7, typical traffic over the bus 109 in whole and half-bus mode is illustrated. The side B half-bus, transferring data from side B to side A is shown at 702. The side A half-bus, transferring data from side A to side B is shown at 704. In the illustrated embodiment, all short bus cycles (e.g., accesses that consume 30 nanoseconds of bus time or less) utilize only half-bus mode. Thus, the short cycle shown at time period 701 which transfers data from side B to side A, is completed solely on the local half-bus. During time period 703, both halves of the bus are idle as indicated by the "I". At the beginning of time period 705, side A begins a long access, which as described, may utilize several hundred nanoseconds of bus time. Initially, during the long access, A transfers data only on the local half-bus. However, while data is being transferred, side B's whole-bus mode arbiter determines whether to grant its half-bus to the external controller during time period 707. Since side B is not using its local half-bus at this time, it grants its use to side A and the long cycle is completed in whole bus mode during time period 709. Thus, the bus is able to exploit idle time by granting use of an idle half-bus to a requesting half bus with a long transfer. Once the half-bus is granted by side B, the whole bus is utilized for the remainder of side A's bus cycle.

During time period 713, side A executes another long cycle transferring data from side A to side B. A side B long cycle begins during time period 715. During time period 717, side A's long cycle 713 has been completed and a short cycle from side A to side B occurs. Once that short cycle completes, side A is available to side B. The arbitration for side A's half-bus occurs during time period 719. Side A grants its half-bus to side B which causes the bus to switch to whole bus mode. The cycle completes in whole bus mode during time period 721. Once the bus cycle is complete, the bus again enters half-bus mode at 723.

In certain embodiments, all initiated bus cycles over the bus are allowed to complete without interruption. If, during the transmission of data, the bus enters whole-bus mode, then it will stay in that mode until the bus cycle is completed. Both side A and side B keep track of the number of bytes being transmitted and when the bus cycle is complete, both sides resume half-bus mode as shown at 711. In other embodiments, as described further herein, bus cycles may be interrupted and entering and leaving whole-bus mode differs according to whether the bus is operating in isochronous or asynchronous priority mode.

Maximum bandwidth requirements are specified for each isochronous stream in terms of bytes per frame. The sum of the isochronous-stream maximum-bandwidth requirements must be less than the theoretical total bandwidth. However, as a matter of practicality, the higher the percentage bandwidth of isochronous streams, the greater the probability that asynchronous traffic will incur latency. In the design of a balanced system, one expects the sum of typical asynchronous bandwidth and maximum isochronous bandwidth to be less than about 60 to 80 percent of the theoretical maximum bandwidth. If that is done, then average latency for asynchronous cycles will be minimized.

Isochronous requesters should not send more bytes across the link, during a frame, than the programmed maximum bandwidth for that requester. Hardware may be implemented in the link layer to ensure that isochronous requesters comply with that requirement.

As discussed, in one embodiment, bus traffic is grouped into 2-microsecond frames. Two counters associated with frames are used in the local request arbitration logic (507 in FIG. 5). They are the elapsed frame counter, which is used to specify how much bandwidth remains in the frame, and the isochronous byte counter, which is used to specify how much isochronous bandwidth remains to be transferred in the frame.

The elapsed frame counter starts, at the beginning of each frame, at a value equal to the number of bytes that can be transferred across the frame (product of the width of the bus in bytes and the number of clock edges in the frame). For example, in a 16-bit, 800 megahertz implementation (data rate), the value of the counter would start out at (1600 bytes per microsecond)×(2 microseconds per frame)=3200. It counts down to zero over the course of the frame, reloads, counts down again, and so forth. When the elapsed-frame counter reaches zero, a new frame is defined to be started. This is true for both sides of the link. When the elapsed frame counter reaches zero, in certain embodiments a new frame (NewFrame) message to is sent across the link to side B, which causes B's elapsed-frame counter to reset.

The isochronous byte counter starts, at the beginning of each frame, at a value equal to the number of isochronous bytes that must be guaranteed to be transferred during the frame. It decrements with each isochronous byte transferred. It is programmed to be slightly higher than the actual maximum isochronous bandwidth of a frame. Shortly after the beginning of each frame, all the isochronous streams make their requests to send data across the bus during the next frame. The requests may be made in the illustrated embodiment within a predetermined time period after the frame starts.

Initially during a frame, asynchronous transfers are granted priority over isochronous transfers (to minimize the latency of the asynchronous transfers), (asynchronous priority mode). However, counter(s) track of how much isochronous traffic passes during the frame and if the isochronous streams are in danger of running out of the required bandwidth for the frame, arbitration priority switches to the isochronous traffic, (isochronous-priority mode). In that way, a minimum amount of isochronous bandwidth can be guaranteed while minimizing latencies for asynchronous transfer requests. After all the isochronous bus cycles for the frame are complete (which occurs before the end of the frame), the priority switches back to the asynchronous traffic.

The bus protocol includes two arbiters: the whole-bus mode arbiter 509 in the protocol layer and the local-request arbiter 507 in the link layer that determines which local requester will next be granted the local half-bus. The local request arbiter operates as follows.

At the beginning of each frame, all isochronous streams that will require bandwidth during the frame request the link from the local-request arbiter. They continue to request the link until they have completed all of their bus cycles for the frame.

It is expected that the total requested bandwidth for the vast majority of frames will be well under 100% and the asynchronous transfers will be granted highest priority for the entire frame. Thus, as described above, asynchronous CPU accesses will most often be granted higher priority than isochronous transfers and therefore incur reduced average latency. In situations where large blocks of bulk asynchronous data are being transferred across the link (for example, from the PCI bus), then the isochronous transfers will tend to come at the end of the frame, after the priority has switched to isochronous bus cycles. In this case, CPU latency will tend to increase as the CPU loses priority to the isochronous bus cycles and contends with the bulk asynchronous transfers.

For each frame, the link either stays in asynchronous priority mode for the entire frame or (1) starts in asynchronous priority mode, (2) transitions to isochronous priority mode during the frame, and (3) then transitions again to asynchronous priority mode before the end of the frame as illustrated in FIG. 4.

The rules for the local-request arbiter are very simple: asynchronous requesters are higher priority than isochronous requesters during asynchronous-priority mode and only isochronous requesters are granted bus cycles during isochronous-priority mode. The arbitration method for the group of asynchronous requesters is not limited other than it is required to be fair and to not cause deadlock situations. The arbitration scheme for the group of isochronous requesters may utilize a fixed priority scheme.

The rules for whole-bus mode arbitration and operation and for entering and exiting whole-bus mode in one embodiment are described below and illustrated in FIGS. 8–11. The change to isochronous priority guarantees that all isochronous bus cycles will complete before the end of the frame.

If the local half-bus is in use for a locally-generated cycle, then arbitration will not take place until that bus cycle is ended. The end of the bus cycle can result from the normal end of the bus cycle or the bus cycle can be halted.

The external transmit controller normally requests whole-bus mode during the address phase of the cycle. If whole-bus mode is not requested, then the local whole-bus mode arbiter will not grant whole-bus mode for the bus cycle. However, this rule changes during isochronous-priority mode (see below). In some embodiments, the request for whole-bus mode can be an explicit bus message. In other embodiments, the request is implicit. For example, an implicit request can be, e.g., any transfer over a particular number of bytes, e.g., 32, which is automatically treated as a request for whole bus mode. If a local half-bus is busy when the request for whole-bus mode is received from the external transmit controller and later becomes idle while the requesting transfer is still active, the local arbiter determines if any other local requesters are present, and if not grants its local half-bus to the external transmit controller.

Figure 8:
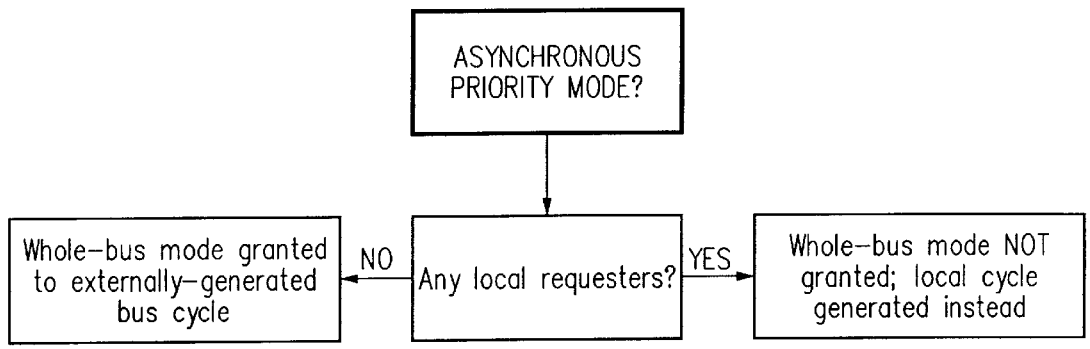
FIG. 8 is a flow diagram illustrating when a local controller should grant whole-bus mode to an external controller when the bus is in asynchronous priority mode.

Referring to FIG. 8, during asynchronous-priority mode, if whole-bus mode is requested by the external side and there are no local requesters for the bus, then whole-bus mode will be granted to the externally generated bus cycle. If, during asynchronous-priority mode, whole-bus mode is requested but there are local requesters, then whole-bus mode will not be granted; the local bus cycle will be granted instead.

Figure 9:
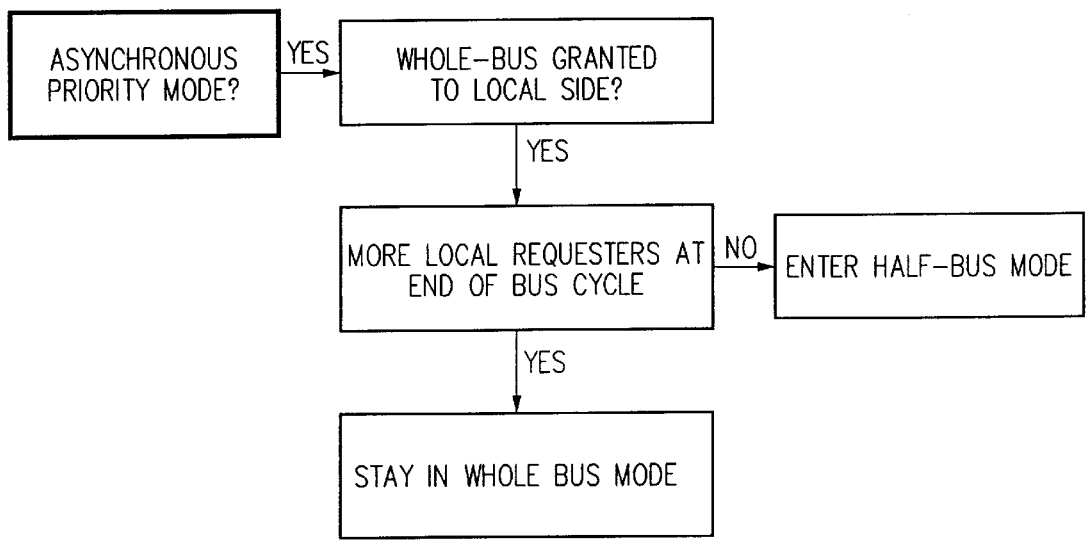
FIG. 9 is a flow diagram illustrating when a local controller should stay in whole-bus mode at the end of a bus cycle when the bus is in asynchronous priority mode.

Referring to FIG. 9, if, during asynchronous-priority mode, whole-bus mode has been granted to the local side and there are more local requesters at the end of the bus cycle, then the bus remains in whole-bus mode for the local requesters' bus cycles. However, if there are no more local requesters, then the link reverts back to half-bus mode at the end of the bus cycle.

Figure 10:
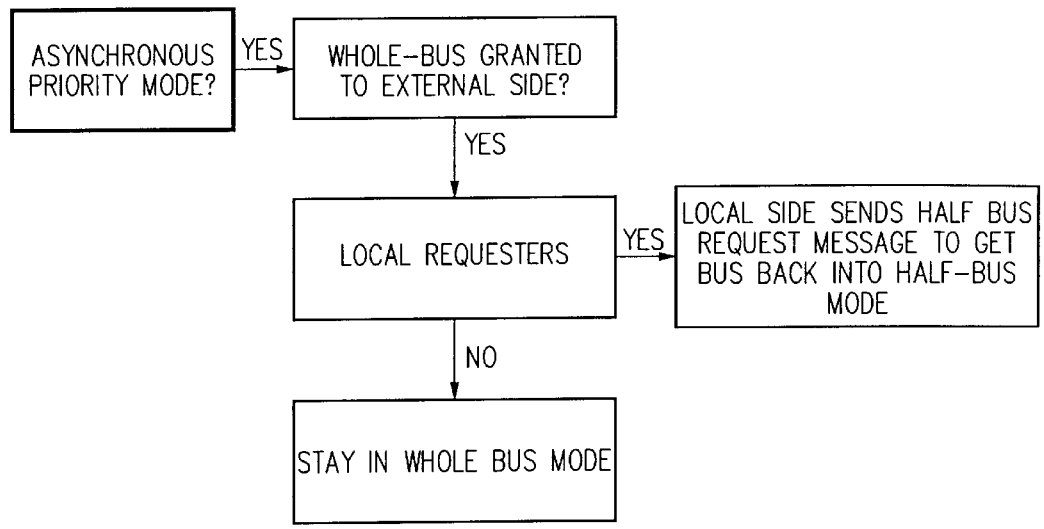
FIG. 10 is a flow diagram illustrating when a local controller stays in whole-bus mode after a whole-bus cycle is granted to the external side.

Referring to FIG. 10, if, during asynchronous-priority mode, whole-bus mode has been granted to the external side and there is a local asynchronous requester, then the local side generates a half-bus request (HalfBusReq) message and the external side is required to place the bus back into half-bus mode.

Figure 11:
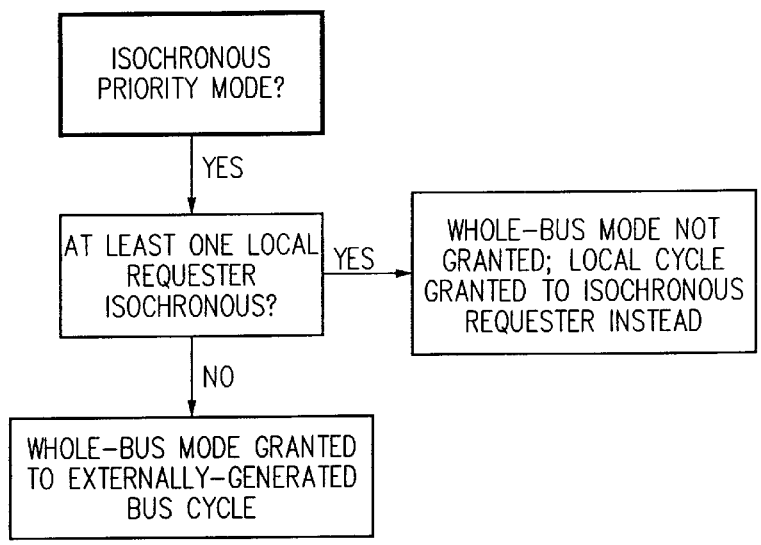
FIG. 11 is a flow diagram illustrating when to grant whole bus mode while the bus is in isochronous priority mode.

Referring to FIG. 11, while in isochronous-priority mode, requests in the address phase of the bus cycle for whole-bus mode are ignored. If, during this mode, there are local isochronous requesters, then whole-bus mode is not granted; the local half-bus is granted to an isochronous requester instead.

If during isochronous-priority mode there are no local isochronous requesters, then whole-bus mode will be automatically granted to the other side of the link. The link will then stay in whole-bus mode, for short and long bus cycles, until the end of the last isochronous bus cycle; after that, the link will return to asynchronous-priority mode. Once in asynchronous-priority mode, the link may or may not stay in whole-bus mode, based on the rules described above.

Figure 12:
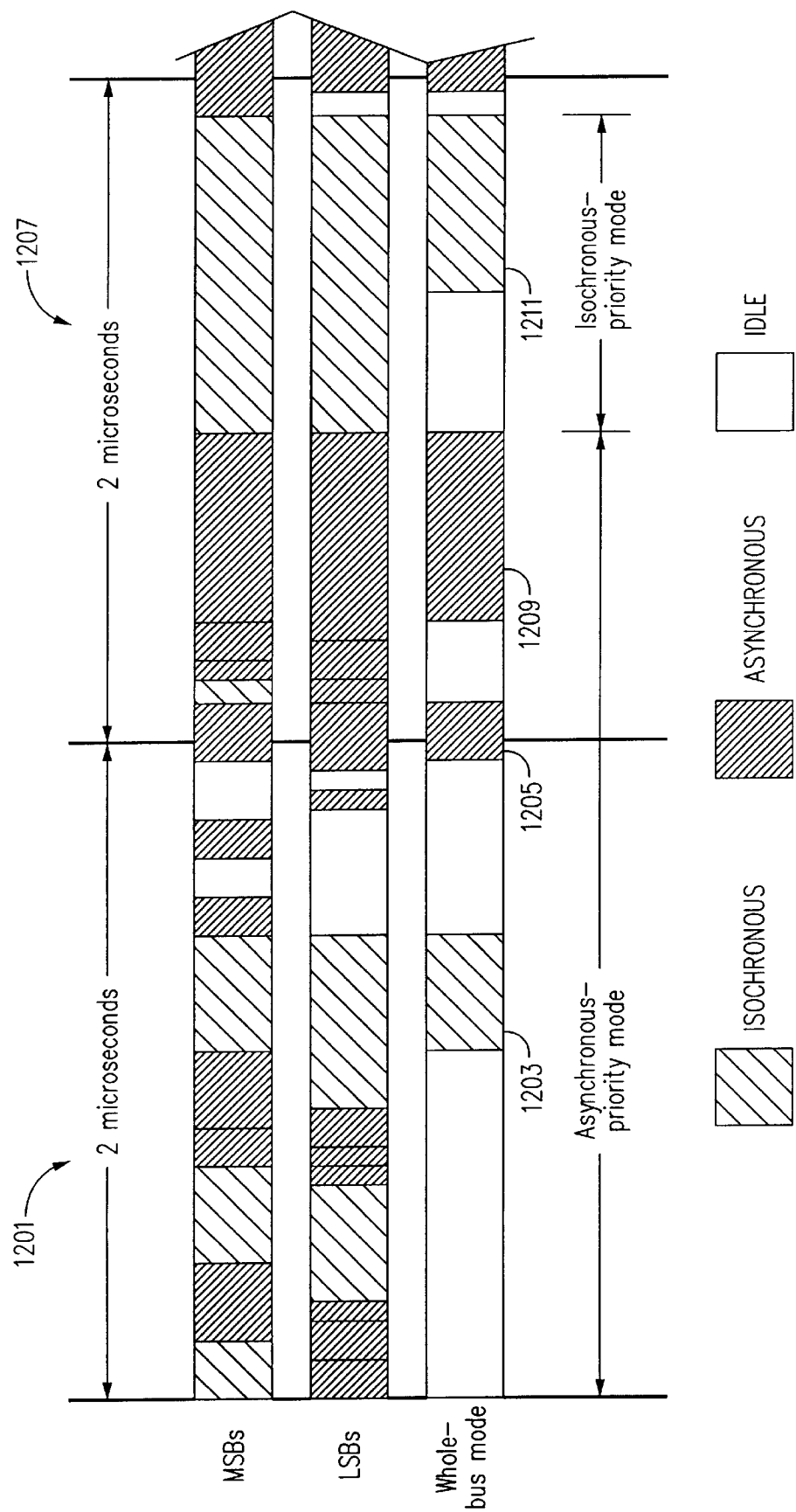
FIG. 12 shows a traffic example including isochronous and asynchronous data and whole and half-bus modes.

FIG. 12 shows a traffic example including isochronous and asynchronous data and whole and half-bus mode. FIG. 12 illustrates how the arbiter optimizes for asynchronous transfers during periods of relatively loose traffic, but when asynchronous traffic dominates, the isochronous bandwidth is still guaranteed. In this example, isochronous bus cycles are assumed to consume slightly more than 50% of the available bandwidth. In the first frame 1201, the isochronous traffic is allowed to occur early, between asynchronous bus cycles because of the lack of asynchronous traffic. At 1203, the bus goes into isochronous whole-bus mode. After isochronous whole bus mode is over, the bus is either idle or transferring asynchronous traffic for the remainder of the frame. At the end of the frame, the bus is in whole-bus mode again except this time, transferring asynchronous data. Note that whole-bus mode may extend across frame boundaries as shown. All the isochronous requesters in frame 1201 complete their bus cycles before getting too close to the end of the frame and thus, isochronous priority mode is unnecessary.

However, in the second frame 1207, the amount of asynchronous traffic has increased to the point where the isochronous bus cycles are in danger of not completing before the end of the frame because of large blocks of asynchronous data. Therefore, the bus enters isochronous-priority mode and the long asynchronous cycle 1209 shown in whole-bus mode is halted. After all the isochronous requesters on one side of the link have completed their bus cycles at 1211, the bus enters into whole-bus mode for the remainder of isochronous-priority mode. Then, after the other side completes all of its remaining isochronous bus cycles in whole-bus mode, the bus is placed back into asynchronous-priority mode. After that, the asynchronous traffic is allowed to continue, through to the next frame.

Figure 13:
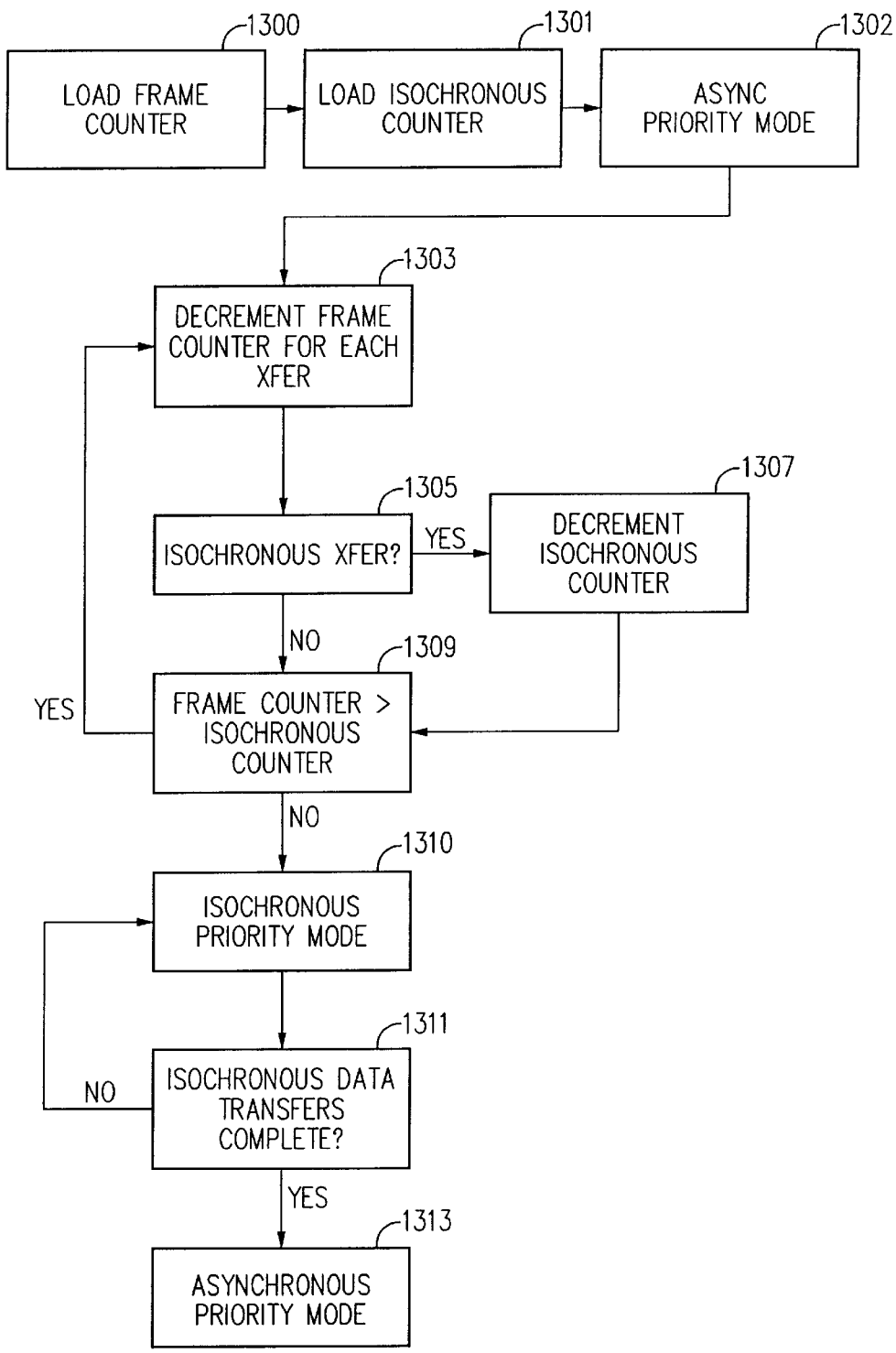
FIG. 13 shows a flow chart for determining if when to enter isochronous priority mode.

Referring to FIG. 13, a flowchart illustrates utilization of the frame counter and isochronous byte counter to enter and exit isochronous mode. At the beginning of the frame 1300 the frame counter is loaded with the number of bytes per frame and the isochronous counter is loaded at 1301 with the maximum number of isochronous bytes that can be transferred each frame. At 1302, the frame enters asynchronous priority mode. At 1303 the frame counter is decremented at the data rate for each possible transfer across the bus (whether or not the bus is actually idle). At 1305, it is determined if an isochronous byte was transferred. If so, the isochronous counter is decremented at 1307. At 1309 it is determined if the elapsed-frame counter has passed the isochronous-byte counter. If so, that indicates when the remaining time in the frame is required to be allocated to the isochronous stream to guarantee that the isochronous requests can be serviced during that frame. If the frame counter is still greater than the isochronous counter, then the frame counter is decremented at 1303 on the next clock edge and the loop repeats. If however, there is a need to switch to isochronous mode, the bus switches at 1310. At 1311 it is determined if the isochronous transfers are complete and if so, the bus returns to asynchronous priority mode at 1313.

Thus, at 1309, if there is at least one isochronous requester requiring the bus, then the local hardware will enter isochronous-priority mode. Any side with an isochronous requester or a current isochronous bus cycle will then send an isochronous priority mode (IsoPriMode) message to the other side, so both sides will be in isochronous-priority mode. If there is a bulk asynchronous transfer taking place, it will be halted as illustrated in FIG. 12.

At this point, all isochronous requesters will be granted the bus, one after another, until there are no more isochronous requesters. The last isochronous bus cycle is guaranteed to complete before the end of the frame.

The first side that finishes the all its isochronous bus cycles sends the asynchronous priority request (AsyPriReq) message across the bus to indicate that it is ready to enter asynchronous-priority mode. This automatically grants whole-bus mode to the other side. The second side continues isochronous bus cycles in whole-bus mode until they are complete. At this point the second side sends the asynchronous priority grant (AsyPriGnt) message, which places the link into asynchronous-priority mode.

So, to enter isochronous-priority mode, only one side needs to send the isochronous priority mode (IsoPriMode) message. However, to exit back into asynchronous-priority mode a side has to have transmitted the AsyPriReq message and the other side has to have transmitted AsyPriGnt message. If side A sends the IsoPriMode message to side B and side B has no isochronous requesters, then side B immediately responds with the AsyPriReq message. The bus then goes back into asynchronous-priority mode as soon as side A finishes its last isochronous bus cycle and sends out the AsyPriGnt message. In the rare case that side A and side B finish their last isochronous bus cycles at the same time and send out AsyPriReq messages simultaneously, then they will both send out HalfBusAck messages and the link will revert back to half-bus mode and asynchronous-priority mode.

In other embodiments, different approaches are used to ensure that isochronous guarantees are met for each frame. For instance, instead of loading the isochronous byte counter with the maximum possible isochronous byte count each frame, each link interface side could load the isochronous byte counter at the start of each frame with the actual isochronous byte count requested for the frame. That counter is then decremented for each isochronous byte transmitted. When the elapsed frame counter indicates that the time remaining in the cycle was approaching or equal to the value of the isochronous byte counter, the bus switches to the isochronous priority mode to ensure the transfer of the isochronous bytes. Such an approach would require that no more than the maximum allocable isochronous bandwidth was requested each frame. Those of skill in the art will recognize that the counters described as counting down may of course be implemented to count in other ways to determine the count value, e.g., the counters may also be implemented as up counters.

In still another approach, the bus may switch to isochronous priority mode at a predetermined time in the frame and any remaining isochronous transfers are transferred at this time. That approach may increase the latency of asynchronous data somewhat, since there may be no need to switch to isochronous priority mode.

Bus messages are transmitted over the least-significant byte of the data bus (which may vary, based on whether the bus is in whole-bus mode or half-bus mode when the byte is transmitted) while CTL (CTLA2B, CTLB2A) is asserted. Thus, the control signals are used to send messages. When in half-bus mode or when the local side owns whole-bus mode, assertion of the local control signal indicates that the least-significant byte of the data bus is transmitting a link message. This may happen when the bus is idle or at any time during a bus cycle. The least-significant byte of the bus may vary based on whether the bus is in whole-bus mode or half-bus mode.

If whole-bus mode is granted to the external side, then the local side can assert CTL (CTLA2B OR CTLB2A) to generate the request for half bus mode (HalfBusReq) message without the benefit of the data bus. This message informs the external side that it must relinquish whole-bus mode, even though it may be in the middle of a bulk transfer. The external side is required to accommodate this request by generating a half bus grant (HalfBusGnt) message, after which the external bus cycle will continue over the external half-bus.

A bus message can be transmitted during any CLK cycle, including when the bus is idle, during the address phase of a transfer, or during the data phase. After the message is transmitted, if there is a bus cycle taking place (and it is not requested to be stopped by the bus message), then the bus cycle will continue on the following CLK cycle, as if it were in suspended animation for a single CLK cycle. Bus messages use all the bytes that are owned by the transmitting side of the link at the time that the message is transmitted. So if the bus is in half-bus mode, the message will be placed on the least-significant byte of the local half-bus; if it is whole-bus mode then it will be placed on the least-significant byte of the whole bus. 5 The bus messages for one embodiment are described in Table 2

TABLE 2

| Bus messages | Description |
|---|---|
| NewFrame | This is used to indicate the beginning of a new frame. |
| IsoPriMode | Enter isochronous-priority mode. The generation of this message, from either or both sides, places both sides into isochronous-priority mode. |
| AsyPriReq | Request to enter asynchronous-priority mode and grant whole-bus mode. This message is sent by the first side to finish transmitting local isochronous bus cycles while in isochronous-priority mode. After the local side transmits the AsyPriReq message, it automatically places the local half-bus into high-impedance mode and enters whole-bus mode. In the rare case that each side both transmits and receives the AsyPriReq message (simultaneously), then it automatically sends the HalfBusAck message and goes back into half-bus mode (both sides will do this) and the link reverts back to asynchronous-priority mode. |
| AsyPriGnt | Grant asynchronous priority mode. This message is transmitted by the second side to finish transmitting local isochronous bus cycles while in isochronous-priority mode. A side determines that it is the second side to finish transmitting isochronous traffic if it has received the AsyPriReq message while in isochronous-priority mode. The AsyPriGnt message places the link into asynchronous-priority mode on the following clock. |
| HaltXfer | Halt the current bulk transfer in progress. The bus cycle that is in progress is immediately stopped by this message. |
| WholeBusGnt | Whole-bus mode grant. This is sent from the side granting whole-bus mode to the side requesting whole bus mode. After it is sent by the local side, the local side places its half-bus into high-impedance mode. |
| WholeBusAck | Whole-bus mode acknowledge. This is sent from the side requesting whole-bus mode, after the other side has sent either the WholeBusGnt or the AsyPriReq message, to indicate that data will be transferred over the whole bus starting on the following clock. The link is still considered to be in half-bus mode while this message is being transmitted. |
| HalfBusReq | When the external side has been granted whole-bus mode, the local side requests that the link be placed back into half-bus mode by asserting the CTL pin for one CLK |

TABLE 2-continued

| Bus messages | Description |
|---|---|
| | cycle. Since the local side controls no data bus pins, there is no decode for this message. |
| HalfBusGnt | The owner of whole-bus mode sends this message in response to the HalfBusReq message to indicate that it is reverting back into half-bus mode. On the clock following this message, the link is considered to be in half-bus mode. |
| HalfBusAck | When the external side owns whole-bus mode and it is ended (by a HalfBusGnt, HaltXfer, or an EndXfer), then this message is sent by the local side to indicate that it is back in control of the half-bus. |

In addition to the message above, bus messages may be used for legacy signal transfers. Legacy signals are those signals in personal computer (or other) systems that are necessitated by the desire to ensure compatibility with older designs. Thus, the interface module may need to transmit legacy signal information to the processor module (PM). In one embodiment bits(3:0) of the message are used to transmit the legacy signals STPCLK#, IGNNE#, CPURST, A20M#. Those legacy signals are known in the art and are not discussed further herein. The interface module (IM) transmits this data each time one of those signals change state.

Further, bus messages may be used to transfer interrupt signals states from the interface module to the processor module. For this bus message bits(3:0) are used to transfer interrupts SMI, NMI, INTR, INIT. The interface module transmits this data each time one of these signals change state.

Finally, legacy information may be needed to be transferred from the processor module to the interface module. For example, FERR# may be transferred in a specific bit position of a bus message. The processor module transmits this data each time one of the signal changes state.

If transferring of legacy information conflicts unduly with whole-bus mode and/or isochronous-priority mode operations, separate signals may be utilized in the computer system for transferring some or all of the legacy and interrupt signals between the processor module and the interface module.

As discussed above, certain situations result in the halt of a bus cycle. For instance, while in asynchronous-priority mode, if a bulk isochronous transfer is taking place and there is an asynchronous requester, then the transfer will be halted to minimize the latency of the asynchronous bus cycle. After entering isochronous-priority mode, if a bulk asynchronous transfer is taking place, it will be halted. The bus is then only granted to isochronous requesters during isochronous-priority mode.

Bus cycles are not halted during their address phase, only during their data as phase. The requester of a halted bus cycle continues to request the cycle. Once it is granted again, data continues from the point where it left off.

The following provides typical examples of bus cycles and streams. The first example is transferring RAMDAC data from system memory (102) to the interface module 107 (see FIG. 1). As previously described, the RAMDAC provides video data to the monitor. The transfer mechanism is as follows. First the Link-to-RAMDAC FIFO in the RAMDAC channel in the interface module (IM) determines the number of bytes to request for frame n+1 at the start of frame n. During a raster line, this value will vary by only one block (perhaps 16 bytes) per frame. The interface module hardware will increase or decrease the number of bytes requested by one block as the FIFO approaches the danger of underrun or overrun. Second, the interface module sends a read request to the processor module (PM) at the beginning of each frame. The requested number of bytes are sent from the system memory-to-link RAMDAC FIFO in the processor module, over the bus, to the interface module RAMDAC FIFO. Note that the processor module has a number of system memory FIFOs dedicated for specific functions such as RAMDAC. Finally, since space is now available in the system memory-to-link RAMDAC FIFO, a request is automatically made to system memory to fill it.

A second example is a PCI read access from interface module to system memory. The transfer mechanism is as follows. (1) The PCI master generates a read request (to system memory) by asserting FRAME#. (2) The interface module is likely to generate an interface module immediate target abort (retry) while the access is being passed to the bus. (3) The read request is placed in the PCI channel's asynchronous read request transmit queue. (4) A read request is sent across the bus and queued in processor module's asynchronous read request receive queue. (5) A minimum number of bytes (e.g. 32) are read out of system memory and placed in a processor module transmit buffer and arbitration for the bus is started. (6) The buffered (32) bytes are transferred across the bus to an interface module PCI asynchronous receive buffer. (7) Data is passed from the receive buffer to the PCI bus as needed by the PCI master. (8) If the PCI master consumes less than half of the bytes transferred across the bus, then the activity is complete and the receive buffer is flushed. (9) If however, the PCI master consumes more than half of the bytes, then steps 3 through 6 are repeated, except that half of the original number of bytes (e.g. half of 32, 16) are transferred to the interface module PCI asynchronous receive buffer. Thus, the interface module PCI asynchronous receive buffer continues to be filled as needed by the PCI bus transfer.

A third example is a PCI write access from the interface module to system memory. The transfer mechanism is as follows. (1) The PCI master initiates a write and data starts filling interface module's PCI asynchronous transmit FIFO. (2) When interface module's PCI asynchronous transmit FIFO is half full, or when the PCI burst is completed, arbitration for the bus begins. (3) Half of the interface module's PCI asynchronous transmit FIFO data is sent across the bus to the processor module's PCI asynchronous receive FIFO where it will be sent to system memory. (4) When the interface module's PCI asynchronous transmit FIFO is more than half full again, then it once again sends the data across the bus to system memory (step 3 is repeated). (5) After the PCI burst is complete, the remaining data is sent to system memory (like step 3 again). (6) After all the data is system memory, then the write acknowledge is sent back to the PCI bus in the interface module.

A fourth example is a CPU I/O read of the PCI bus. The transfer mechanism is as follows. (1) A read request is placed in the processor module's PCI asynchronous transmit buffer. (2) A read request is sent across the bus and placed in interface module's asynchronous receive buffer. (3) A read request is transformed into PCI cycle and data is transferred to the interface module's asynchronous read response buffer. (4) Read data is then transferred across the bus and placed in the processor module's asynchronous read response FIFO. (5) Finally, read data is transferred from the read response FIFO to the CPU.

A final example is of a CPU I/O write of PCI bus. The transfer mechanism is as follows. (1) A write request is placed in processor module's PCI asynchronous transmit buffer along with write data. (2) A write request is passed across the bus and placed in interface module's PCI asynchronous receive buffer. (3) A PCI write cycle is completed. (4) A write acknowledge is sent across the bus, to the CPU.

Note that if the interface module's PCI asynchronous receive queue is full when the next asynchronous write request is received, then a "write failed" message is sent back across the bus. The processor module is then responsible for waiting and then re-sending the write request.

The above describe bus is designed to allow expansion through bridges. It is also intended to allow interchangeability between chipset components-such as the processor module and the interface module-from different manufacturers. It is further intended to allow for implementation in systems without requiring changes to the operating system.

The description of the invention set forth herein is illustrative, and is not intended to limit the scope of the invention as set forth in the following claims. Variations and modifications of the embodiments disclosed herein, may be made based on the description set forth herein, without departing from the scope and spirit of the invention as set forth in the following claims.

What is claimed is:

1. A method of transferring information on a bus between a first and a second integrated circuit, the information including address information, isochronous data, asynchronous data and control information, the method comprising:

transferring data on the bus in asynchronous priority mode during a first portion of a first time period, wherein during asynchronous priority mode, asynchronous data has priority over isochronous data for transfers on the bus; and selectably switching to isochronous priority mode for a second portion of the first time period to guarantee transfer of a predetermined amount of isochronous data during the first time period.

2. The method as recited in claim 1 wherein the first portion includes the beginning of the first time period.

3. The method as recited in claim 1 wherein no asynchronous data is transferred during isochronous priority mode.

4. The method as recited in claim 3 wherein isochronous data is transferred during asynchronous priority mode.

5. The method as recited in claim 1 wherein the predetermined amount of isochronous data is the maximum amount of isochronous data that can be transferred during the first time period over the bus.

6. The method as recited in claim 1 wherein the predetermined amount of isochronous data is the actual amount of isochronous data that is requested to be transferred during the first time period.

7. The method as recited in claim 1, further comprising:

after switching to isochronous priority mode, switching back to asynchronous priority mode for a third portion of the first time period, the third portion occurring after all isochronous data transfers for the first time period are completed.

8. The method as recited in claim 1 wherein each of the integrated circuits includes a plurality of request circuits requesting to transfer data across the bus, each integrated circuit including at least one isochronous request circuit and at least one asynchronous request circuit.

9. The method as recited in claim 1 wherein the determining comprises:

keep track of an amount of isochronous data transferred during the first time period;

keep track of an amount of time remaining in the first time period;

switching to isochronous priority mode according to the time remaining in the first period, the predetermined amount of isochronous data to be transferred and the amount of isochronous data transferred so far in the first time period, to guarantee that at least the predetermined amount of isochronous data may be transferred during the first time period.

10. The method as recited in claim 1 wherein switching to isochronous priority mode occurs when any integrated circuit coupled to the bus wants to switch to isochronous priority mode and transmits a control message on the bus indicative thereof.

11. The method as recited in claim 1 further comprising:
determining in a local-request arbiter which of a plurality of requesters in the first integrated circuit will send data on the bus during the first time period, with at least one of the requesters being isochronous and at least one of the requesters being asynchronous, according to whether the bus is in isochronous or asynchronous priority mode.

12. The method as recited in claim 1 further comprising halting transfer of an asynchronous block of data when entering isochronous priority mode.

13. The method as recited in claim 1 further comprising:
halting transfer in the middle of an isochronous block of data when in asynchronous priority mode and a request is made to transfer an asynchronous block of data; and transferring the asynchronous block of data after halting the isochronous block of data.

14. The method as recited in claim 1 wherein a bus message having control information is sent during isochronous priority mode.

15. The method according to claim 1 wherein selectably switching includes determining whether an amount of time remaining in the first time period is greater than a transfer time required to guarantee transfer of the predetermined amount of isochronous data during the first time period.

16. The method as recited in claim 15 wherein the bus remains in asynchronous priority mode if it is determined that the amount of time remaining in the first time period is greater than the transfer time.

17. An apparatus comprising:
a bus interface coupled to transfer information to and from a bus, the information including address information, isochronous data, asynchronous data and control information, the bus interface including, an arbiter circuit responsive to a priority mode of the bus to selectably transfer one of asynchronous and isochronous data over the bus, the arbiter determining a priority mode of the bus to be asynchronous priority mode during a first portion of a predetermined time period on the bus, the arbiter guaranteeing transfer of a predetermined amount of isochronous data by selectably switching to isochronous priority mode for a second portion of the first time period, wherein during asynchronous priority mode, asynchronous data transfers are preferentially selected over isochronous transfers and wherein during isochronous priority mode isochronous data transfers are preferentially selected over asynchronous transfers.

18. The apparatus as recited in claim 17 wherein the arbiter circuit is further responsive to control information received over the bus to enter isochronous priority mode.

19. The apparatus as recited in claim 17 further comprising a plurality of channels, each channel coupled to the bus interface and a respective one of a plurality of functional circuits, and wherein a first of said channels processes asynchronous data and a second of said channels processes isochronous data, the first and second channels being coupled to respectively provide an asynchronous request and an isochronous request to the arbiter circuit to transfer data across the bus.

20. The apparatus as recited in claim 17 wherein the bus interface comprises:
a first receive controller, coupled to receive from the bus a first clock signal, a first control signal and at least a first receive data signal, the first control and receive data signal being received synchronously with said first clock signal; and a first transmit controller, coupled to provide the bus a second clock signal, a second control signal and at least a second data signal, the second control and the second data signal being provided synchronously with said second clock signal.

21. The apparatus as recited in claim 19 wherein each of the channels includes at least one of a transmit and receive buffer, the transmit and receive buffers storing a plurality of data for transmitting to and receiving from the bus.

22. The apparatus as recited in claim 21 wherein the transmit and receive buffers are implemented as first-in-first out (FIFO) buffers.

23. The apparatus as recited in claim 17 wherein the first portion includes the beginning of the first time period.

24. The apparatus as recited in claim 17 wherein the arbiter circuit selects no asynchronous data for transfer during isochronous priority mode.

25. The apparatus as recited in claim 24 wherein isochronous data is selected by the arbiter circuit for transfer during asynchronous priority mode if no asynchronous requests are presented in the arbiter circuit.

26. The apparatus as recited in claim 17 wherein the predetermined amount of isochronous data is the maximum amount of isochronous data that can be transferred during the first time period over the bus.

27. The apparatus as recited in claim 17 wherein the predetermined amount of isochronous data is the actual amount of isochronous data that is requested to be transferred during the first time period by the channels.

28. The apparatus as recited in claim 17, wherein the arbiter circuit is responsive to completion of all isochronous data transfers for the first time period to switch back to asynchronous priority mode for a third portion of the first time period.

29. The apparatus as recited in claim 17 wherein the arbiter circuit further comprises:
a first counter for tracking an amount of isochronous data transferred during the first time period;

a second counter for tracking an amount of time left in the first time period; and wherein the arbiter circuit is responsive to switch to isochronous priority mode according to the time remaining in the first time period, the predetermined amount of isochronous data to be transferred and the amount of isochronous data transferred so far, thereby guaranteeing that at least the predetermined amount of isochronous data is transferred during the first time period.

30. The apparatus as recited in claim 17 wherein the arbiter circuit provides control information to the bus when the arbiter circuit makes a determination to enter isochronous priority mode, the control information indicative of the determination to enter isochronous priority mode.

31. The apparatus as recited in claim 17 wherein the arbiter circuit halts transfer of an asynchronous block of data when entering isochronous priority mode.

32. The apparatus as recited in claim 17 wherein the arbiter circuit halts transfer in the middle of an isochronous block of data when in asynchronous priority mode and a request is made to transfer an asynchronous block of data.

33. The apparatus as recited in claim 19 wherein the arbiter circuit is disposed on a processor module, the processor module further including a central processing unit and system memory, the central processing unit and system memory each being one of the functional circuits.

34. The apparatus as recited in claim 33 further comprising an interface module coupled to the bus, the interface module including a second bus interface and a second arbiter circuit, and an additional plurality of channels coupled to the second arbiter circuit and an additional plurality of functional circuits respectively coupled to the additional plurality of channels.

35. An apparatus comprising:

means for transmitting and receiving information on a bus, the information including address information, isochronous data, asynchronous data and control information;

means for transmitting information on the bus in asynchronous priority mode during a first portion of a first time period, wherein during asynchronous priority mode asynchronous data has priority over isochronous data for transfers on the bus; and means for selectably switching to isochronous priority mode for a second portion of the first time period to guarantee transfer of a predetermined amount of isochronous data during the first time period.

36. The apparatus as recited in claim 35 wherein the first portion includes the beginning of the first time period.

37. The apparatus as recited in claim 35 wherein no asynchronous data is transferred during isochronous priority mode.

38. The apparatus as recited in claim 37 wherein isochronous data is transferred during asynchronous priority mode.

\* \* \* \* \*